United States Patent [19]
Ashida

[11] Patent Number: 5,893,816
[45] Date of Patent: Apr. 13, 1999

[54] ENGINE IDLE ROTATION SPEED CONTROLLER

[75] Inventor: Masaaki Ashida, Tokyo, Japan

[73] Assignee: Nissan Motor Company, Ltd., Yokohama, Japan

[21] Appl. No.: 08/948,576

[22] Filed: Oct. 10, 1997

[30]     Foreign Application Priority Data

Oct. 11, 1996  [JP]  Japan .................. 8-270027

[51] Int. Cl.[6] .......................... F02D 29/02; F02D 41/08
[52] U.S. Cl. ............................................. 477/111
[58] Field of Search ........................ 477/93, 111, 114

[56] References Cited

U.S. PATENT DOCUMENTS

| | | | |
|---|---|---|---|
| 4,563,989 | 1/1986 | Peter | 477/111 |
| 4,580,535 | 4/1986 | Danno et al. | 477/111 |
| 4,653,622 | 3/1987 | Miyake | 477/114 |
| 4,966,111 | 10/1990 | Fujimoto et al. | 477/111 |
| 5,460,580 | 10/1995 | Streib | 477/114 |
| 5,549,525 | 8/1996 | Wendel | 477/93 |

FOREIGN PATENT DOCUMENTS

62-233429  10/1987  Japan.

*Primary Examiner*—Dirk Wright
*Attorney, Agent, or Firm*—Foley & Lardner

[57] ABSTRACT

A rotation speed is feedback controlled to a target rotation speed during idle running of an engine. When an automatic transmission is in a travel range, a brake is being operated and a vehicle speed is less than a predetermined value, the target rotation speed is decreased. A required vehicle creep force is different according to whether the vehicle has substantially stopped such as when it is waiting on a crossing, or whether it is moving in the idle running state as when it is being garaged or is following a vehicle in front of it in a traffic jam. By decreasing the target rotation speed according to the vehicle speed, an optimum creep force is obtained in both cases.

13 Claims, 7 Drawing Sheets

ENGINE IDLE ROTATION SPEED CONTROLLER

FIELD OF THE INVENTION

This invention relates to control of rotation speed during idle rotation of an engine.

BACKGROUND OF THE INVENTION

In a vehicle engine, in order to prevent the speed from falling due to load changes when the engine is running idle, a type of control is known where the idle rotation speed is feedback controlled so that the real rotation speed is identical to a target rotation speed. However when the idle rotation speed is fixed at a predetermined level, the engine rotation speed (idle rotation speed) may be too high when the brake is operated in order to decelerate, and the driver experiences discomfort during the deceleration.

In this regard, Tokkai Sho 62-233429 published by the Japanese Patent Office in 1987 proposes an engine idle rotation controller which, when the brake is operated, drops the target rotation speed as compared to the case when the brake is not operated. Herein the operation of the brake refers to the depression of a brake pedal or operation of a parking brake.

However, if the brake pedal is depressed and released as when, for example, the vehicle is being garaged or is following a vehicle in front of it in a traffic jam, the vehicle moves at a low speed. In the case of the aforesaid controller, even under these conditions, the target rotation speed decreases every time the brake is depressed. When the brake pedal is next released, therefore, creep force of the vehicle is insufficient so that either the vehicle does not start or starts only very sluggishly. As a result, the accelerator pedal must again be depressed to start the vehicle, hence the accelerator pedal must be operated frequently. The creep force refers to the force tending to move the vehicle when the automatic transmission is within traveling range and the accelerator pedal is not at all depressed. Herein traveling range refers to a range other than the parking and neutral ranges.

However, when the driving force is set so that sufficient creep force is obtained even when the target rotation speed has decreased, the creep force is then excessive when the automatic transmission is in traveling range and the brake is depressed to prevent the vehicle from moving.

The above case occurs frequently especially when the vehicle is in a short stop or waiting to start on a crossing, so the brake pedal must be strongly depressed to suppress the creep force.

Further in the aforesaid controller, the target rotation speed is decreased without considering the situation when the engine is warming up or the air conditioner is operating. When the engine is cold or the air conditioner is operating, the idle rotation speed easily tends to fall, so decreasing the target rotation speed under these conditions is undesirable from the viewpoint of preventing speed fluctuations.

SUMMARY OF THE INVENTION

It is therefore an object of this invention to decrease idle rotation speed when a vehicle has stopped and not decrease idle rotation speed when the vehicle is traveling even for the same idle running conditions.

It is a further object of this invention not to decrease idle rotation speed when an engine is cold or an air conditioner is operating.

In order to achieve the above objects, this invention provides an idle rotation speed feedback controller for use with a vehicle engine connected to an automatic transmission. The controller comprises a sensor for detecting a real engine rotation speed, a sensor for detecting a travel range of the automatic transmission, a sensor for detecting a brake operation of the vehicle, a sensor for detecting a vehicle speed, a mechanism for varying a torque generated by the engine, and a microprocessor. The microprocessor is programmed to set an engine target rotation speed during idle running of the engine, feedback control the torque varying mechanism according to a difference between the real rotation speed and the target rotation speed, apply a decrease correction to the target rotation speed when the automatic transmission is within a travel range, the brake is operated during idle running of the engine and the vehicle speed is less than a predetermined value.

It is preferable that the microprocessor is further programmed to prohibit application of the decrease correction of the target rotation speed when the vehicle speed is equal to or higher than the predetermined value.

It is also preferable that the microprocessor is further programmed to decrease the target rotation speed with a predetermined delay time when the transmission is within a travel range during idle running, the brake operation is performed, and prohibition of the target rotation speed decrease correction is not applied.

It is also preferable that the microprocessor is further programmed to decrease the target rotation speed in stages.

It is also preferable that, if the vehicle comprises an engine tachometer for displaying an engine rotation speed, the microprocessor is further programmed to damp the display of the tachometer in conjunction with the decrease correction of the target rotation speed.

It is also preferable that, if the vehicle comprises an engine tachometer for displaying an engine rotation speed, the microprocessor is further programmed to damp the display of the tachometer when the target rotation speed increases after it has decreased.

It is also preferable that the controller further comprises a sensor for detecting an engine cold start state, and the microprocessor is further programmed to prohibit the decrease correction of the target rotation speed in the engine cold start state.

It is also preferable that the controller further comprises a sensor for detecting an operation of an air conditioner, and the microprocessor is further programmed to prohibit the decrease correction of the target rotation speed when the air conditioner is operating.

It is also preferable that the torque varying mechanism is a mechanism for varying an air flowrate supplied to the engine.

It is further preferable that the engine comprises an air intake passage in which a throttle is installed and an auxiliary air intake passage for bypassing the throttle, and the air flowrate varying mechanism comprises an auxiliary air valve installed in the auxiliary air passage.

It is also preferable that the torque varying mechanism is a mechanism for varying a fuel amount supplied to the engine.

It is also preferable that the torque varying mechanism is an ignition timing variation mechanism.

This invention also provides an idle rotation speed feedback controller for use with a vehicle engine connected to an automatic transmission. The controller comprises a sensor for detecting a travel range of the automatic transmission, a sensor for detecting a brake operation of the vehicle, a sensor for detecting a vehicle speed, a mechanism for varying a torque generated by the engine, a mechanism for setting an engine target rotation speed during idle running of the engine, a mechanism for feedback controlling an engine torque according to a difference between the real rotation speed and the target rotation speed, a mechanism for applying a decrease correction to the target rotation speed when the automatic transmission is within a travel range, the brake is operated during idle running of the engine and the vehicle speed is lower than a predetermined value.

The details as well as other features and advantages of this invention are set forth in the remainder of the specification and are shown in the accompanying drawings.

DESCRIPTION OF THE PREFERRED EMBODIMENTS

Figure 1:
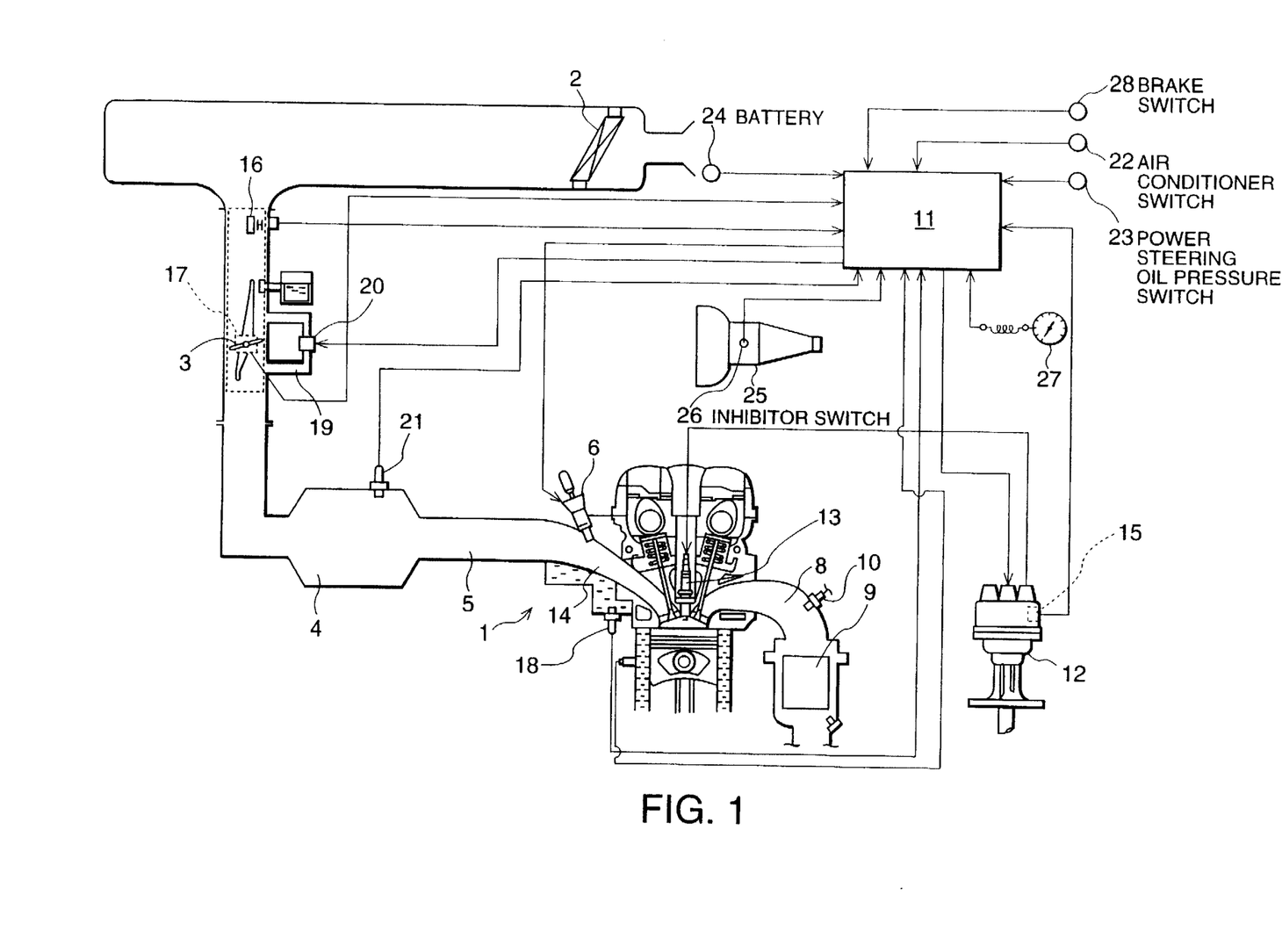
FIG. 1 is a schematic diagram of an idle rotation speed controller according to this invention.

Referring to FIG. 1 of the drawings, an engine 1 aspirates air from an air cleaner 2. The flowrate of intake air is adjusted by a throttle 3 operating in conjunction with an accelerator. After being temporarily stored in a collector 4, the intake air is supplied to each cylinder via an intake manifold 5.

Fuel is injected toward an air intake port 14 from a fuel injection valve 6 based on an injection signal output by an electronic control unit (ECU) 11. A fuel-air mixture is thereby supplied to each cylinder.

An ignition device comprising a distributor 12 and ignition plug 13 ignites the fuel-air mixture in the cylinder. The gas burnt in the cylinder is discharged to the atmosphere via an exhaust passage 8. A catalytic converter 9 for oxidizing or reducing hydrocarbons (HC), carbon monoxide (CO) and nitrogen oxides (NOx) is provided midway in the exhaust passage 8.

A Ref signal and 1 degree signal from a crank angle sensor 15 built into the distributor 12, an intake air volume signal from an air flow meter 16, a throttle opening signal from a throttle sensor 17, a cooling water temperature from a water temperature sensor 18, an air conditioner operation signal from an air conditioner switch 22, a power steering operation signal from a power steering oil pressure switch 23, a battery voltage signal from a battery 24, a selector position signal from an inhibitor switch 26 fitted to an automatic transmission 25, a vehicle speed signal from a vehicle speed sensor 27 for detecting vehicle speed, and a brake signal from a brake switch 28 which indicates the operating state of a brake, are input to the ECU 11. The ECU 11 controls the fuel injection amount (air-fuel ratio) and ignition period while determining the running state based on these signals.

The engine 1 comprises an auxiliary air passage 19 which bypasses the throttle 3. A rotary solenoid type auxiliary air valve 20 which responds to an output signal from the ECU 11 is installed in the auxiliary air passage 19. The auxiliary air valve 20 switches ON and OFF according to a pulse signal of fixed frequency, and increases the auxiliary air amount the larger an ON duty proportion. In reality, the auxiliary air valve 20 is not a single valve, but is a valve unit comprising another air supply device such as for example an FICD solenoid. When for example the air conditioner is operating, the ECU 11 controls the idle rotation speed to a target rotation speed via control of this valve unit.

The target rotation speed during idle running of the engine 1 is first determined according to the cooling water temperature, elapsed time after engine startup, battery voltage, power steering operating state, air conditioner operating state and selector position. In this case, the ECU 11 comprises a built-in timer.

When the idle rotation speed feedback control conditions are established, the ECU 11 calculates an ON duty feedback correction amount of the signal output to the auxiliary air valve 20 such that the real rotation speed coincides with the target rotation speed during idle rotation, and corrects a basic value of the ON duty previously found by this correction amount.

Further, when the vehicle stops when the engine is in the idle running state and the automatic transmission is within traveling range, the ECU 11 decreases the target rotation speed as in the case of the aforesaid prior art device. These conditions exist for example when the vehicle is in a short stop or is waiting to start on a crossing. The decrease of target rotation speed ensure that the vehicle remains at rest under these conditions and lead to an improvement of fuel-cost performance.

On the other hand, when the vehicle is being garaged or is following a vehicle in front of it in a traffic jam, the vehicle is traveling in the idle running state and the brake pedal is also depressed occasionally.

In this case, the target rotation speed is not decreased so as to ensure drivability of the vehicle.

Next, the idle rotation speed control performed by the ECU 11 will be described referring to the flowcharts of FIGS. 2, 3 and 5.

Figure 2:
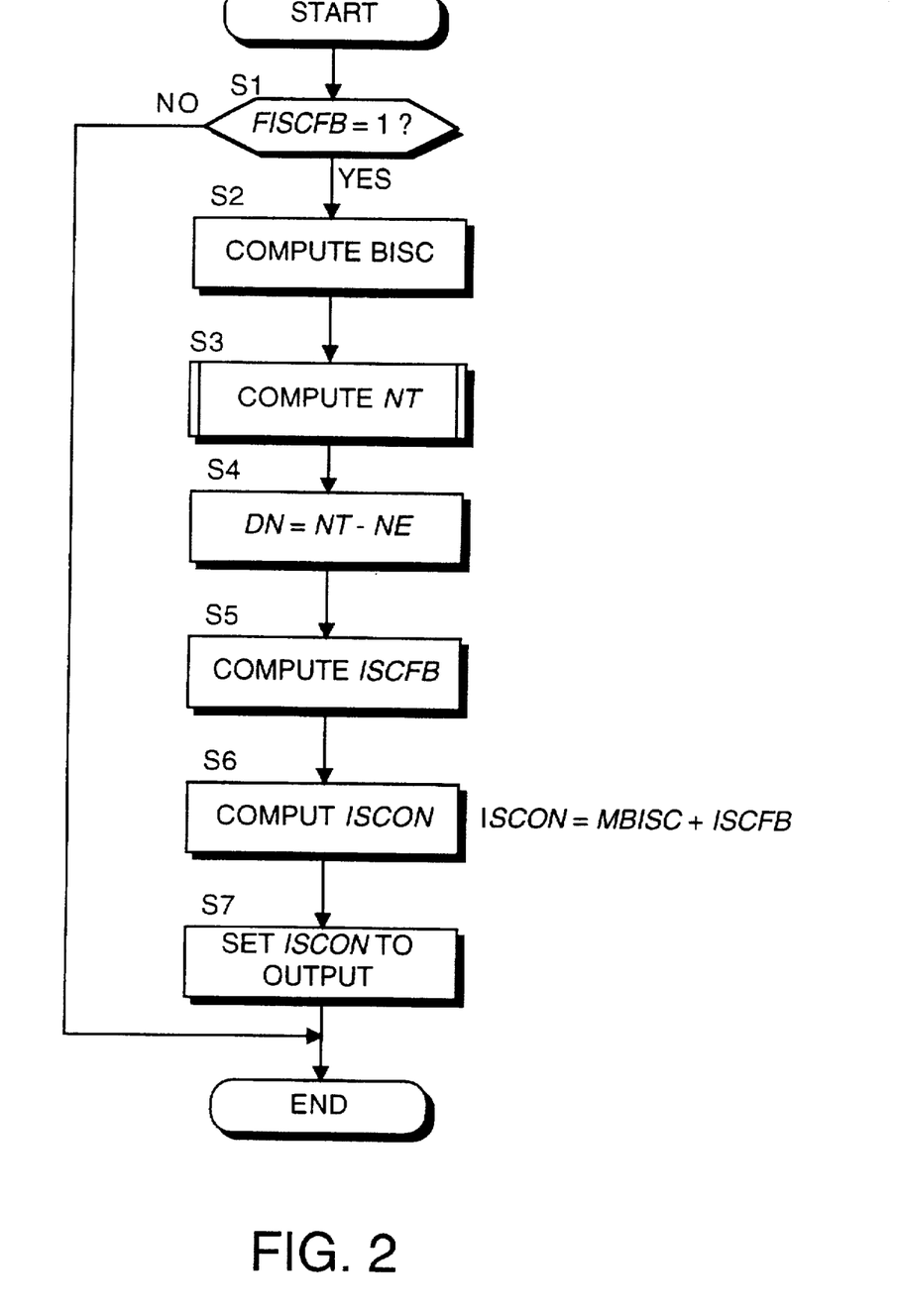
FIG. 2 is a flowchart describing an idle rotation speed feedback control process executed by the idle rotation speed controller.

The flowchart of FIG. 2 shows the idle rotation speed feedback control process performed via the auxiliary air valve 20. This process is executed at an interval of, for example, 10 ms.

In a step S1, a feedback flag FISCFB is determined. This feedback flag FISCFB is set based on the vehicle speed, engine rotation speed and throttle opening by a separate 10 ms job, not shown. In this job, when all of the following conditions (1) to (3) are satisfied, the flag FISCFB is set to "1", and when at least one of the conditions does not hold, the flag is reset to "0". The flag FISCFB is initialized to "0" on startup.

Condition (1): The throttle is fully closed.

Condition (2): The engine rotation speed is equal to or less than a predetermined rotation speed (constant rotation speed) N1.

Condition (3): The vehicle speed is equal to or less than a predetermined value (e.g. of the order of 8 km/hr).

When FISCFB=1, it is determined that the Idle rotation speed feedback control conditions are satisfied and the routine proceeds to a step S2. When FISCFB=0, the routine terminates without performing further steps.

In the step S2, a basic value BISC (5) of the ON duty supplied to the auxiliary air valve 20 is found. The basic value BISC is a value which is determined based on the cooling water temperature, and is found by looking up a table stored in the ECU 11.

In a step S3, a target rotation speed NT is computed. The target rotation speed NT is computed from a process shown in FIG. 3.

Figure 3:
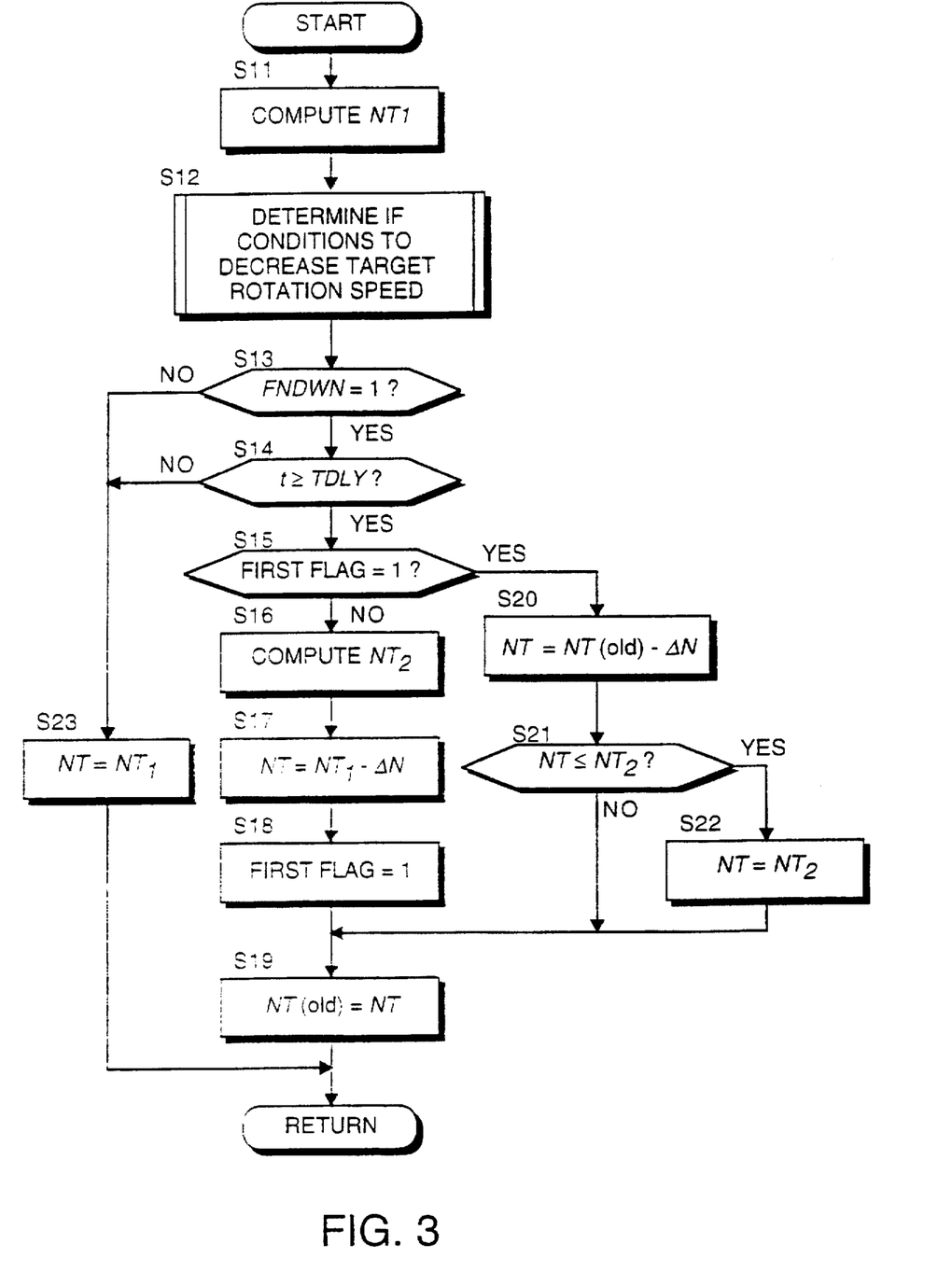
FIG. 3 a flowchart describing a process for computing a target rotation speed NT executed by the idle rotation speed controller.

In FIG. 3, a first target rotation speed $NT_1$ is first computed in a step S11. The first target rotation speed $NT_1$ corresponds to the target rotation speed for idle rotation in a prior art device. Specifically, it takes account of the stopping characteristics on a sloping road and the driving characteristics when the vehicle is traveling under idle engine rotation, and is a predetermined value based on the cooling water temperature TW, elapsed time after startup, battery voltage, power steering operation signal, air conditioner operating signal and selector position signal. It is found by looking up a table stored in the ECU 11 according to variations in these parameters.

Figure 4:
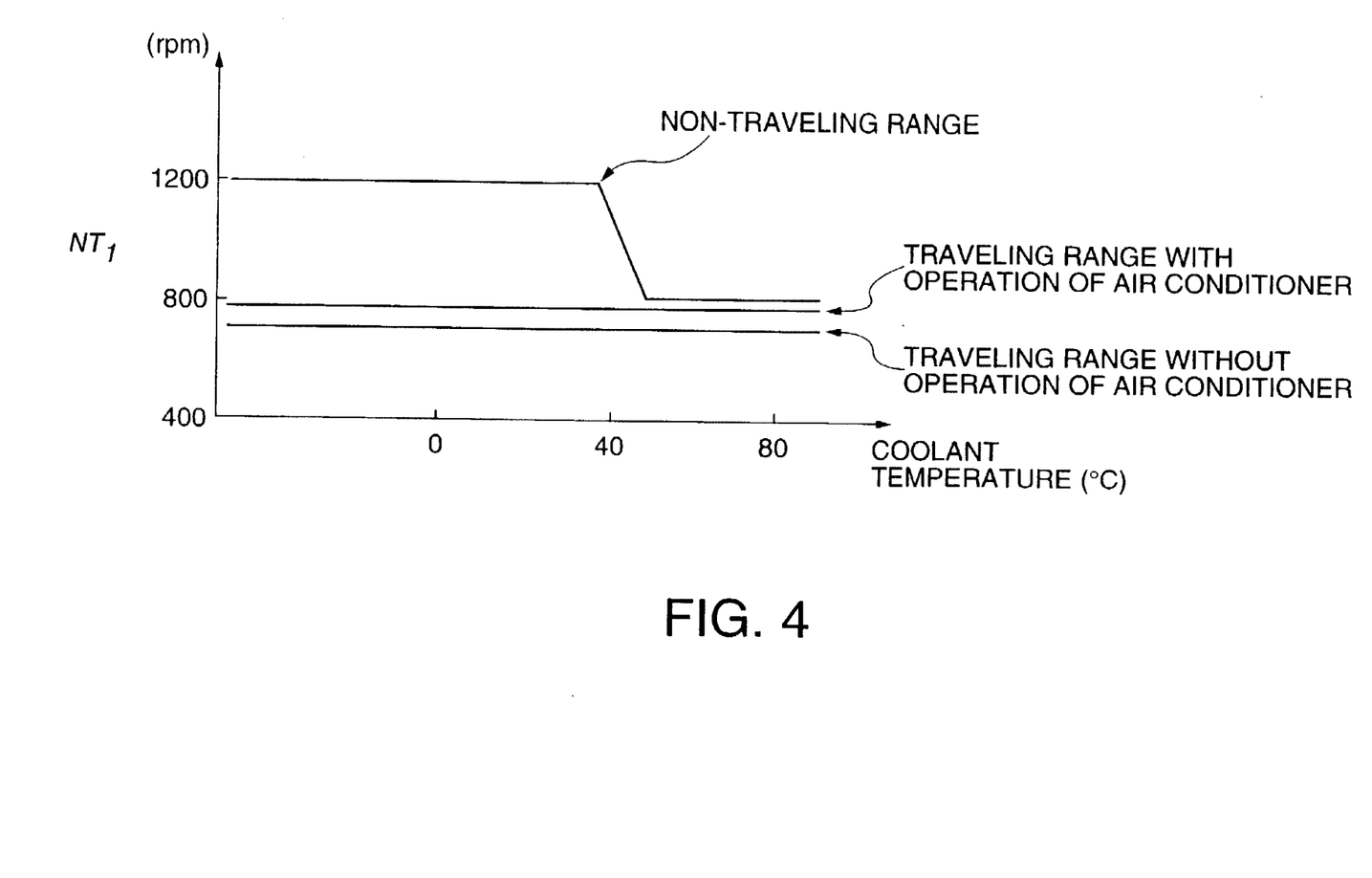
FIG. 4 is a graph showing the characteristics of a first target rotation speed NT, set by the idle rotation speed controller.

For example, as shown in FIG. 4, when the selector position is in traveling range and the air conditioner is changed over from non-operation to operation, the first target rotation speed $NT_1$ is increased. When the engine is in a low temperature state at 40° C. or below and the selector position is in the non-traveling range, $NT_1$ is increased so that engine stall, torque fluctuation and rotation fluctuation are avoided.

In a step S12, it is determined whether or not the conditions hold for decreasing the target rotation speed. This determining process is shown in FIG. 5. Each item of steps S31–S36 in FIG. 5 is checked, and when each item is satisfied, it is determined that the conditions hold for decreasing the target rotation speed. When any of the conditions are not satisfied, it is determined that the conditions for decreasing the target rotation speed do not hold.

These conditions are:

Step S31: Engine warmup is complete

Step S32: Idle running conditions hold

Step S33: Air conditioner is operating

Step S34: Automatic transmission is in traveling range

Step S35: Brake is being operated

Step S36: Vehicle speed is substantially 0 km/hr

When all of the above conditions are satisfied, a flag FNDWN is set to "1" in a step S37. During startup of the engine 1, the flag FNDWN is initialized to "0". A timer t is also started in a step S38.

When any of the above conditions is not satisfied, the routine proceeds to a step S39 and the flag FNDWN is set to "0", then in a step S40, a first flag is set to "0". This first flag is also initialized to "0" during startup of the engine 1, and the timer t is also reset in a step S41.

FNDWN =1 signifies that the conditions hold for decreasing the target rotation speed, whereas FNDWN =0 signifies that the conditions do not hold for decreasing the target rotation speed. The meaning of the term "first flag" will be described hereafter.

Of the aforesaid steps S31–S36, the steps S31, S33 and S36 represent the pertinent features of this invention. The determination of warmup state of the step S31 is based on the cooling water temperature signal from the water temperature sensor 18. The determination of operating state of the air conditioner of the step S33 is based on the air conditioner operating signal from the air conditioner switch 22. The determination of vehicle speed of the step S36 is based on the vehicle speed signal from the vehicle speed sensor 27. In practice, it is determined that the vehicle speed is substantially 0 km/hr when it is less than a predetermined low speed, e.g. 4 km/hr.

Herein, the reason why the target rotation speed is not decreased when the engine is in the warmup state is that, if the target rotation speed were decreased when the engine is in the warmup state in which combustion is unstable, speed variations would increase. Likewise, the reason why the target rotation speed is not decreased when the air conditioner is operating is that, if the target rotation speed were decreased when the air conditioner is operating, speed variations would again increase.

The reason why the target rotation speed is not decreased when the vehicle speed ≠0 km/hr is as follows. If the target rotation speed were decreased when the vehicle is required to travel under creep force as when it is being garaged or following a vehicle in front in a traffic jam, i.e. when the vehicle speed ≠0 km/hr, the vehicle could not be made to start simply by releasing the brake pedal due to insufficient creep force, and must be started by depressing the accelerator pedal. In this case, if the target rotation speed is not decreased, sufficient creep force is obtained so that the vehicle can be obtained merely by releasing the brake pedal. Desirable driving characteristics are obtained if the vehicle is started and stopped simply by use of the brake pedal.

The determination of idle driving conditions of the step S32 is based on the throttle opening signal, the Ref signal and the vehicle speed signal. The determination of traveling range of the step S34 is based on the selector position signal from the inhibitor switch 26, and a speed change range signal output by a control unit for the automatic transmission, not shown. The determination of braking state of the step S35 is made according to a braking signal from the brake switch 28. The brake switch 28 is a switch which switches ON when the brake pedal is in a stroke position such that the required braking force is obtained.

Figure 5:
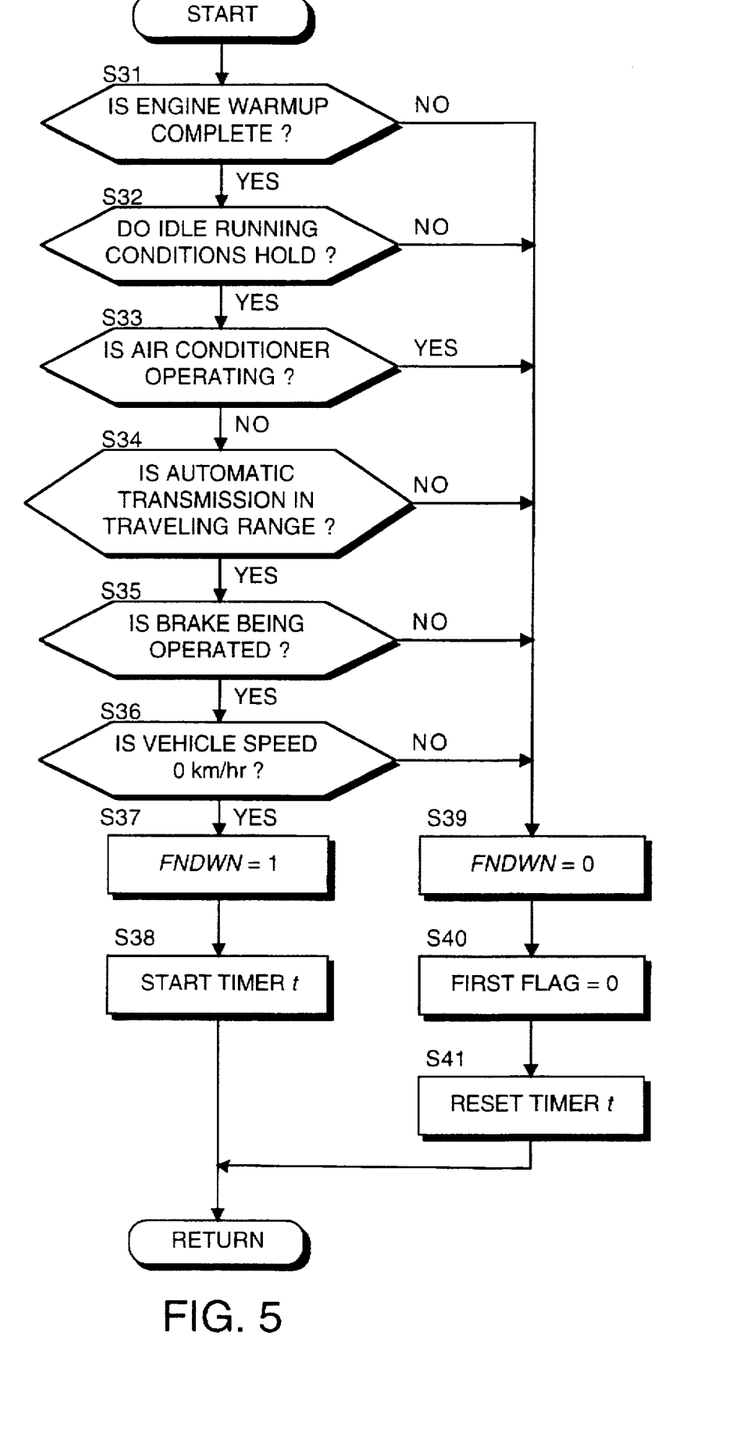
FIG. 5 is a flowchart describing a determining process of target rotation speed reduction conditions executed by the idle rotation speed controller.

After determining whether or not the conditions hold for decreasing the target rotation speed by the process of FIG. 5, the routine returns to a step S13 of FIG. 3. In the step S13, the flag FNDWN is examined. When FNDWN=0, i.e. when the conditions for decreasing the target rotation speed do not hold, the routine proceeds to a step S23, the first target rotation speed $NT_1$ is entered as the target rotation speed NT, and the routine of FIG. 3 is terminated.

When FNDWN=1 in the step S13, i.e. when the conditions for decreasing the target rotation speed do hold, the routine proceeds to a step S14. Herein, the timer t which was started in the step S38 is compared with a predetermined time delay TDLY, and when t<TDLY, the operation of the step S23 is executed and the routine of FIG. 3 is terminated. When t≧TDLY, the routine proceeds to a step S15.

Herein, the time delay TDLY is a time delay from when the conditions for decreasing the target rotation speed hold to when the target rotation speed is actually decreased. The stroke of the brake pedal is determined according to factors such as the required brake pedal depression force, and a sufficient stroke to set the required hysteresis cannot be obtained merely by switching the brake switch ON and OFF. The time delay TDLY is therefore provided instead to prevent hunting under idle rotation speed control.

The step S15 and steps S16–S22 show a process for smoothly decreasing the target rotation speed to a second target rotation speed $NT_2$ ($NT_2<NT_1$) from the first target rotation speed $NT_1$. In the step S15, the first flag is determined. After the flag FNDWN has become 1, which shows that the conditions hold for decreasing target rotation speed, when the routine first proceeds to the step S15, the first flag=0. In this case, the routine proceeds to the step S16 from the step S15, and the second target rotation speed $NT_2$ is computed. Herein, the second target rotation speed $NT_2$ is set within a range such that the following disadvantages do not arise due to decrease of the target rotation speed.

(A) Other performance aspects are affected, (B) The driver experiences discomfort, (C) The driver feels insecure due to the engine stalling.

Regarding (A), speed change operations of the automatic transmission are performed according to the oil pressure of an oil pressure pump driven by the engine. For example, when the automatic transmission is in a N range, the minimum oil amount required to supply the automatic transmission is determined by the oil amount flowing into the automatic transmission and the oil amount flowing out of the automatic transmission. There is therefore a particular engine rotation speed required to ensure this minimum oil amount. There is another particular engine rotation speed to ensure an oil amount required for the change-over operation of the automatic transmission. The second target rotation speed $NT_2$ is set so that it is less than these particular engine rotation speeds.

In the step S17, the target rotation speed NT is set to a value obtained by subtracting a predetermined (positive) value $\Delta N$ from the first target rotation speed $NT_1$.

In the step S18, "1" is entered in the first flag. The first flag is therefore a flag which is first set to "1" when the time delay TDLY has elapsed from when the conditions for decreasing the target rotation speed hold.

In the step S19, the value of NT is shifted to a parameter NT(old) for storing the target rotation speed on the immediately preceding occasion in order to perform control on the next occasion, and the routine of FIG. 3 is terminated.

In the step S18, when the first flag is set to "1", the first flag=1 in the determination of the step S15 in control on the next occasion. The process therefore proceeds to the step S20, and the target rotation speed NT is set to a value obtained by subtracting the predetermined value $\Delta N$ from NT(old).

In the step S21, this NT is compared with the second target rotation speed $NT_2$ computed in the step S16 of the immediately preceding process.

When $NT>NT_2$, the operation of the step S19 is performed, and the routine of FIG. 3 is terminated. By repeating the step S20, the target rotation speed NT is decreased in increments of the predetermined value $\Delta N$, and eventually $NT<NT_2$. In this case, the routine proceeds to the step S22, and the second target rotation speed $NT_2$ is entered in NT. This means that the target rotation speed NT is limited so that it does not fall below the second target rotation speed $NT_2$. Subsequently, the operation of the step S19 is performed and the routine of FIG. 3 is terminated.

When computation of the target rotation speed NT is completed by the process of FIG. 3 in this way, the routine returns to a step S4 of FIG. 2, and a difference $\Delta N$ (rpm) between the target rotation speed NT and real rotation speed NE is calculated.

In a step S5, an ON duty feedback correction amount ISCFB (%) supplied to the auxiliary air valve 20 is calculated based on this difference $\Delta N$.

In a step S6, the ON duty ISCON (%) is calculated from the equation ISCON=BISC+ISCFB.

In a step S7, this ISCON is transferred to an output register for controlling the auxiliary air valve 20.

In feedback control of the idle rotation speed, when the real rotation speed NE is less than the target rotation speed NT, the feedback amount is increased. In other words, the flowrate through the auxiliary air valve 20 is increased so as to increase the engine torque. Conversely when the real rotation speed NE is higher than the target rotation speed NT, the feedback amount is decreased so as to decrease the engine torque. In this manner, the idle rotation speed is made to converge to the target rotation speed NT.

According to the above process, when the vehicle moves forward under creep force in the idle running state such as when garaging the vehicle or when it is following a vehicle in front of it in a traffic jam, when the brake is not depressed, the routine of FIG. 5 proceeds from the step S35 to the step S39, and when the brake pedal is depressed, the routine of FIG. 5 proceeds from the step S36 to the step S39. In both cases the flag FNDWN=0, which is the condition for not reducing the target rotation speed. Therefore, there is no lack of creep force when garaging the vehicle or following a vehicle in front. Conversely, when the brake is depressed to stop the vehicle while it is still in travel range, such as when it is parked for a short time or is waiting on a crossing, the vehicle speed=0 km/hr, so the routine of FIG. 5 proceeds from the step S36 to a step S37 and the flag FNDWN=1, which is the condition for reducing the target rotation speed. The vehicle stop state is therefore maintained without fail, and fuel consumption during this period is reduced.

When the engine is starting cold or when the air conditioner is operated as shown in steps S31, S33 of FIG. 5, the process proceeds to a step S39 and the flag FNDWN=0, which is the condition for not reducing the target rotation speed. The target rotation speed is therefore not reduced if the engine is starting cold or when the air conditioner is operated when the idle rotation speed tends to fall, so engine rotation fluctuations or engine stall due to decrease of target rotation speed are avoided.

Also, even when the target rotation speed is decreased, it is not decreased suddenly but in stages by applying the first flag as shown in the steps S15–S22, and torque fluctuations due to sudden changes of the target rotation speed are suppressed.

However when the target rotation speed is reduced, the real rotation speed is also reduced and the rotation speed displayed on a tachometer of the vehicle decreases. As this rotation speed decrease is not due to operation of the accelerator pedal, the driver may experience discomfort. In order to avoid this discomfort the tachometer display may be damped, or the tachometer response may be made less fine, e.g. it may be made to respond every 100 revolutions instead of every 50 revolutions.

When there is a change from conditions under which the target rotation speed is decreased to conditions under which it is not decreased, the target rotation speed NT must be rapidly changed to the first target rotation speed $NT_1$. In this case, if the real rotation speed rapidly increases although the accelerator pedal is not depressed, the driver may experience discomfort. Here also, this discomfort can be avoided by damping the engine tachometer or making the tachometer response less sensitive.

Figure 7:
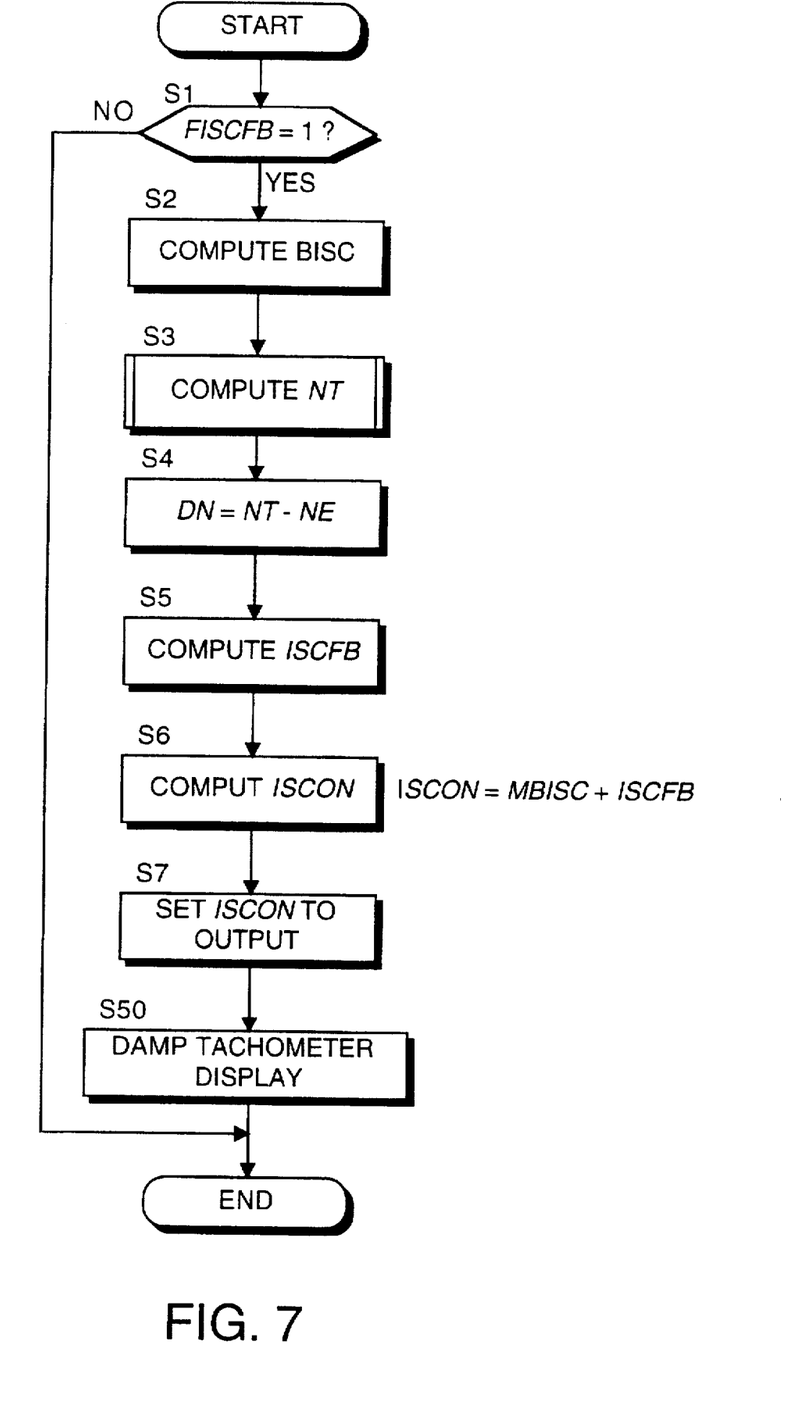
FIG. 7 is similar to FIG. 2, but showing another embodiment of this invention.

Damping of the engine tachometer is achieved by providing a step S50 for performing damping after the step S7, as shown in FIG. 7. According to the aforesaid embodiment, the speed is constant when the target rotation speed is reduced, however in order to enhance the control response, it is preferable to rapidly decrease speed during the first half of target speed reduction, and gradually decrease speed during the latter half so as to avoid overshoot.

Instead of the brake switch 28, predetermined processing may be performed on a stop lamp switch or auto cruise release switch, and the output used as a brake signal.

Figure 6A:
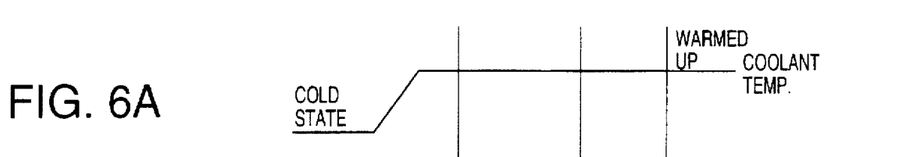
FIGS. 6A–6I are timing charts showing typical results of controlling idle rotation speed according to the idle rotation speed controller.
Figure 6B:
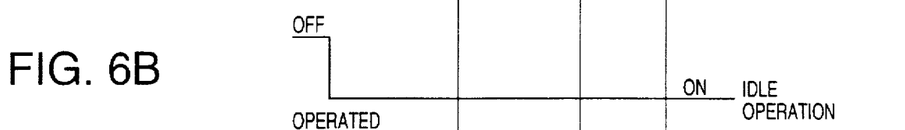
Figure 6C:
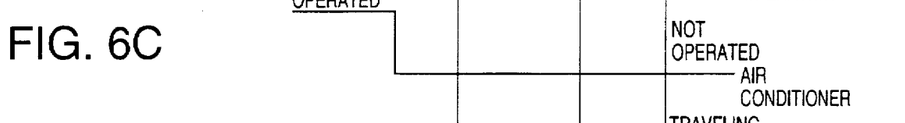
Figures 6D, 6E:
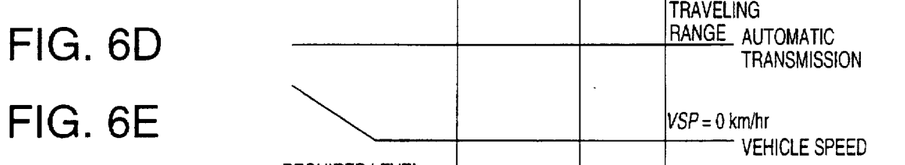
Figure 6F:
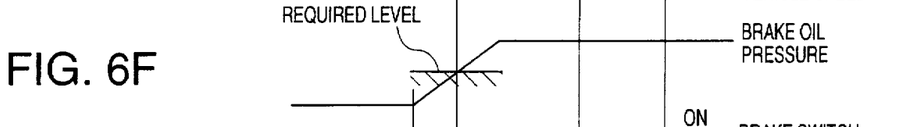
Figure 6G:
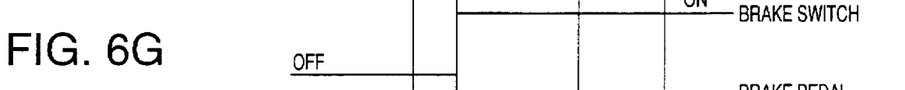
Figures 6H, 6I:
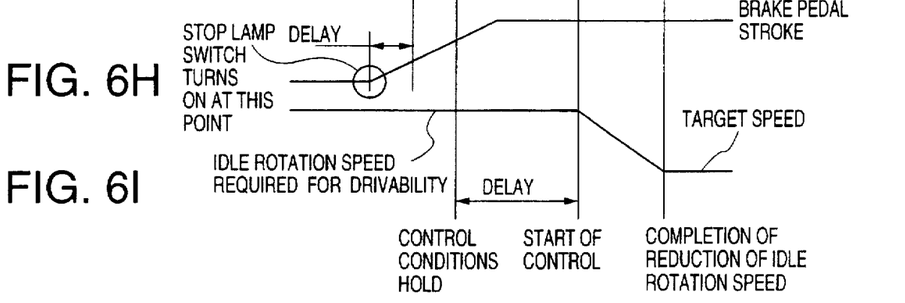

Taking the stop lamp switch as an example, the switch contacts close before the brake oil pressure increases as shown in FIG. 6H. For this reason, second contacts are added to the stop lamp switch which close in a brake pedal stroke position at which a required braking force is obtained, and the signal from these second contacts is used instead of the signal from the brake switch 28.

Further, according to this embodiment, the idle rotation speed is feedback controlled using the air flowrate control valve 20, but this invention may be applied also for example to controllers which feedback control the idle rotation speed by any of the following means:

(1) a mechanism for increasing/decreasing fuel injection amount, (2) a mechanism for increasing/decreasing assist air in an engine provided with an assist air injector, (3) a mechanism for increasing/decreasing throttle opening in an engine provided with a throttle which responds to an electrical signal.

This invention may also be applied to a controller which feedback controls the idle rotation speed using an ignition timing control mechanism.

In addition to the idle rotation speed, the ECU 11 controls the fuel injection amount (air-fuel ratio) and the ignition timing as described hereabove. Hence, feedback control of the idle rotation speed maybe performed by controlling the fuel injection amount or the ignition timing during idle running instead of controlling the air flowrate control valve 20, and this invention may also be applied in such a case.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. An idle rotation speed feedback controller for use with an engine provided for a vehicle, said engine being connected to an automatic transmission, comprising:
a sensor for detecting a real engine rotation speed,
a sensor for detecting a travel range of said automatic transmission,
a sensor for detecting a brake operation of said vehicle,
a sensor for detecting a vehicle speed,
a mechanism for varying a torque generated by said engine, and
a microprocessor programmed to:
set an engine target rotation speed during idle running of the engine;
feedback control the torque varying mechanism according to a difference between the real rotation speed and the target rotation speed; and
apply a decrease correction to the target rotation speed when the automatic transmission is within a travel range, the brake is operated during idle running of the engine and the vehicle speed is lower than a predetermined value.

2. An idle rotation feedback controller as defined in claim 1, wherein said microprocessor is further programmed to prohibit application of said decrease correction of said target rotation speed when the vehicle speed is equal to or higher than the predetermined value.

3. An idle rotation feedback controller as defined in claim 1, wherein said microprocessor is further programmed to decrease said target rotation speed with a predetermined delay time when said transmission is within a travel range during idle running, said brake operation is performed, and the vehicle speed is lower than a predetermined value.

4. An idle rotation feedback controller as defined in claim 1, wherein said microprocessor is further programmed to decrease said target rotation speed in stages.

5. An idle rotation feedback controller as defined in claim 1, wherein said vehicle comprises an engine tachometer for displaying an engine rotation speed, and said microprocessor is further programmed to damp the display of said tachometer in conjunction with the decrease correction of said target rotation speed.

6. An idle rotation feedback controller as defined in claim 1, wherein said vehicle comprises an engine tachometer for displaying an engine rotation speed, and said microprocessor is further programmed to damp the display of said tachometer when said target rotation speed increases after it has decreased.

7. An idle rotation feedback controller as defined in claim 1, wherein said controller further comprises a sensor for detecting an engine cold start state, and said microprocessor is further programmed to prohibit said decrease correction of said target rotation speed in the engine cold start state.

8. An idle rotation feedback controller as defined in claim 1, wherein said controller further comprises a sensor for detecting an operation of an air conditioner, and said microprocessor is further programmed to prohibit said decrease correction of said target rotation speed when said air conditioner is operating.

9. An idle rotation feedback controller as defined in claim 1, wherein said torque varying mechanism is a mechanism for varying an air flowrate supplied to said engine.

10. An idle rotation feedback controller as defined in claim 9, wherein said engine comprises an air intake passage in which a throttle is installed and an auxiliary air intake passage for bypassing said throttle, and said air flowrate varying mechanism comprises an auxiliary air valve installed in said auxiliary air passage.

11. An idle rotation feedback controller as defined in claim 1, wherein said torque varying mechanism is a mechanism for varying a fuel amount supplied to said engine.

12. An idle rotation feedback controller as defined in claim 1, wherein said torque varying mechanism is an ignition timing variation mechanism.

13. An idle rotation speed feedback controller for use with an engine provided for a vehicle, said engine being connected to an automatic transmission, comprising:
a sensor for detecting a real engine rotation speed,
a sensor for detecting a travel range of said automatic transmission,
a sensor for detecting a brake operation of said vehicle,
a sensor for detecting a vehicle speed,
a mechanism for varying a torque generated by said engine,
means for setting an engine target rotation speed during idle running of the engine,
means for feedback controlling an engine torque according to a difference between the real rotation speed and the target rotation speed, and
means for applying a decrease correction to the target rotation speed when the automatic transmission is within a travel range, the brake is operated during idle running of the engine and the vehicle speed is lower than a predetermined value.

* * * * *